United States Patent
Jung et al.

(10) Patent No.: US 9,616,769 B2
(45) Date of Patent: Apr. 11, 2017

(54) TORQUE CONTROL APPARATUS AND METHOD FOR DRIVE MOTOR

(71) Applicants: Hyundai Motor Company, Seoul (KR); Kia Motors Corporation, Seoul (KR)

(72) Inventors: Jae Won Jung, Seoul (KR); Kyu Il Lee, Gyeonggi-Do (KR); Sung Gone Yoon, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/550,948

(22) Filed: Nov. 22, 2014

(65) Prior Publication Data
US 2015/0360582 A1    Dec. 17, 2015

(30) Foreign Application Priority Data
Jun. 11, 2014 (KR) .................. 10-2014-0070961

(51) Int. Cl.
*G06F 19/00* (2011.01)
*B60L 15/20* (2006.01)

(52) U.S. Cl.
CPC .......... *B60L 15/20* (2013.01); *B60L 2240/423* (2013.01); *Y02T 10/644* (2013.01); *Y02T 10/7275* (2013.01)

(58) Field of Classification Search
CPC ... B60L 15/20; B60L 2240/423; B60W 10/06; B60W 20/00; F02D 41/22; B60K 2741/065; F02P 17/08
USPC ................. 701/99; 318/434; 477/39, 117
See application file for complete search history.

(56) References Cited

U.S. PATENT DOCUMENTS

| | | | | |
|---|---|---|---|---|
| 6,083,139 A * | 7/2000 | Deguchi | ............... | B60K 6/442 180/65.23 |
| 8,204,664 B2 * | 6/2012 | Minarcin | ................. | B60K 6/26 180/65.21 |
| 2005/0080523 A1 * | 4/2005 | Bennett | .................. | B60K 6/445 701/22 |
| 2006/0017414 A1 * | 1/2006 | Joe | ......................... | B60K 6/445 318/432 |
| 2008/0227593 A1 * | 9/2008 | Bartels | .................... | F16D 48/06 477/39 |
| 2009/0054205 A1 * | 2/2009 | Maekawa | ........... | B60W 10/026 477/109 |

(Continued)

FOREIGN PATENT DOCUMENTS

| | | |
|---|---|---|
| JP | 2012-182935 A | 9/2012 |
| KR | 10-2005-0057104 A | 6/2005 |

(Continued)

*Primary Examiner* — Shardul Patel
(74) *Attorney, Agent, or Firm* — Mintz Levin Cohn Ferris Glovsky and Popeo, P.C.; Peter F. Corless

(57) ABSTRACT

A torque control apparatus and method for a drive motor is provided. The torque control method includes determining whether an input request torque is a rising torque or a falling torque. In addition, a controller is configured to select one of a rising rate map and a falling rate map based on a result of the judgment on the input request torque. Further, the controller is configured to adjust a rising rate of the rising torque using the rising rate map or a falling rate of the falling torque using the falling rate map.

11 Claims, 4 Drawing Sheets

(56) References Cited

U.S. PATENT DOCUMENTS

2010/0305838 A1* 12/2010 Yamamura .......... F02D 41/1497
701/113
2013/0060409 A1* 3/2013 Matsushita ............ B60K 6/442
701/22

FOREIGN PATENT DOCUMENTS

| KR | 10-0867823 B1 | 11/2008 |
|----|---------------|---------|
| KR | 10-2009-0039327 A | 4/2009 |
| KR | 10-2012-0067847 | 6/2012 |

* cited by examiner

TORQUE CONTROL APPARATUS AND METHOD FOR DRIVE MOTOR

CROSS-REFERENCE TO RELATED APPLICATION

The present application claims priority to Korean Patent Application Number 10-2014-0070961 filed on Jun. 11, 2014, the entire contents of which are incorporated herein by reference.

BACKGROUND

Technical Field

The present disclosure relates, to a torque control apparatus and method for a drive motor and, more particularly, to a torque control apparatus and method for a drive motor which reduces shock that results from drive motor torque change.

Description of the Related Art

Generally, an electric vehicle and a fuel cell vehicle include a motor. The motor is used to propel the electric vehicle and fuel cell vehicle. Additionally, electric vehicles and fuel cell vehicles are equipped with a motor control unit (MCU) configured to adjust a motor torque.

In a tip-in (e.g., when pressure is applied to the accelerator to accelerate the electric vehicle or the fuel cell vehicle) or a tip-out (e.g., when pressure is removed from the accelerator), shock or noise may occur and negatively affect ride comfort. More particularly, substantial shocks or noises are caused by a tip-in at substantially low-speed due to regenerative braking or a tip-out to enable regenerative braking. Therefore, it is necessary to reduce shocks and noises caused by the tip-in or the tip-out using the MCU.

The information disclosed in this section is merely for the enhancement of understanding of the background of the disclosure, and should not be taken as an acknowledgment or as any form of suggestion that this information forms a prior art that would already be known to a person skilled in the art.

SUMMARY

The present disclosure provides a torque control apparatus and method for a drive motor which may reduce shock created by a tip-in or tip-out and apply different variable maps of input torque to the tip-in and the tip-out.

One exemplary aspect of the present disclosure provides a torque control apparatus for a drive motor that may include a controller. The controller may be configured to determine (e.g., judge) whether an input request torque is a rising torque or a falling torque, select a rising rate map or a falling rate map based on the determination of the input request torque, and adjust a rising rate of the rising torque based on the rising rate map or a falling rate of the falling torque based on the falling rate map. The controller may further be configured to determine a rising rate or a falling rate of a subsequently-input request torque based on a value of output torque output from the controller. Further, the controller may also be configured to store the value of output torque and determine a rising rate or a falling rate of the subsequently-input request torque based on the stored value of the output torque.

The rising rate map may be one of a plurality of the rising rate maps and the falling rate map may be one of a plurality of the falling rate maps and the controller may further be configured to select one map from among the plurality of the rising rate maps and the plurality of the falling rate maps based on a plurality of shift modes. The plurality of shift modes may include a drive (D) shift mode and a low (L) shift mode.

The controller may include: a limiter configured to adjust the rising rate or the fall rate of the input request torque; a first supply section configured to store the rising rate map, wherein the first supply section may be configured to receive a signal of output torque output from the limiter and supply a rising rate that corresponds to the output torque to the limiter when the input request torque is determined to be a rising torque; and a second supply section may be configured to store the falling rate map, wherein the second supply section may be configured to receive the signal of the output torque output from the limiter, and supply a falling rate that corresponds to the output torque to the limiter when the input torque is determined to be a falling torque.

Another aspect of the present disclosure provides a torque control method for a drive motor. The torque control method may include: determining, by a controller, whether a request torque is a rising torque or a falling torque; selecting, by the controller, one of a rising rate map and a falling rate map based on the determination of whether the request torque is the rising torque or the falling torque; and adjusting, by the controller, a rising rate of the rising torque using the rising rate map or a falling rate of the fall torque using the falling rate map.

The torque control method may further include storing, at the controller, a final value of the request torque, the adjusted rising rate, or the adjusted falling rate. The adjusting of the rising rate or the falling rate may further include adjusting the rising rate or the falling rate of the request torque based on a rising rate or a falling rate that corresponds to a final value of a previous request torque that is previously stored. Furthermore, the above referenced torque control apparatus and method for a drive motor can be embodied as a non-transitory computer wadable medium containing program instructions that determine whether an input request torque is a rising torque or a falling torque, select a rising rate map or a falling rate map based on a result of the determination of the input request torque, and adjust a rising rate of the rising torque using the rising rate map or a falling rate of the falling torque using the falling rate map.

The non-transitory computer readable medium may also include program instructions determine a rising rate or a falling rate of a subsequently-input request torque based on a value of output torque output from the controller. Further, the non-transitory computer readable medium may include program instructions that store the value of output torque; and program instructions that determine a rising rate or a falling rate of the subsequently-input request torque based on the stored value of the output torque. Furthermore, wherein the rising rate map is one of a plurality of rising rate maps and the falling rate map is one of a plurality of falling rate maps, the non-transitory computer readable medium may further include program instructions that select one map from among the plurality of the rising rate maps and the plurality of the falling rate maps based on a plurality of shift modes.

In addition, the non-transitory computer readable medium may include program instructions that control the rising rate or the fall rate of the input request torque using a limiter, program instructions that store the rising rate map within a first supply section, program instructions that receive a signal of output torque output from the limiter and supply a rising rate corresponding to the output torque to the limiter using the first supply section when the input request torque is determined to be a rising torque, program instructions that store the falling rate map within a second supply section, and program instructions that receive the signal of the output torque output from the limiter and supply a falling rate corresponding to the output torque to the limiter using the second supply section when the input torque is determined to be a falling torque.

According to the torque control apparatus and method for a drive motor as set forth above, it may be possible to apply different rising and falling rate maps to tip-in and tip-out situations, which may reduce shock in response to different torque behaviors of rising and falling torques.

BRIEF DESCRIPTION OF THE DRAWINGS

The above and other objects, features and advantages of the present disclosure will be more clearly understood from the following detailed description when taken in conjunction with the accompanying drawings, in which.

DETAILED DESCRIPTION

Figure 1:
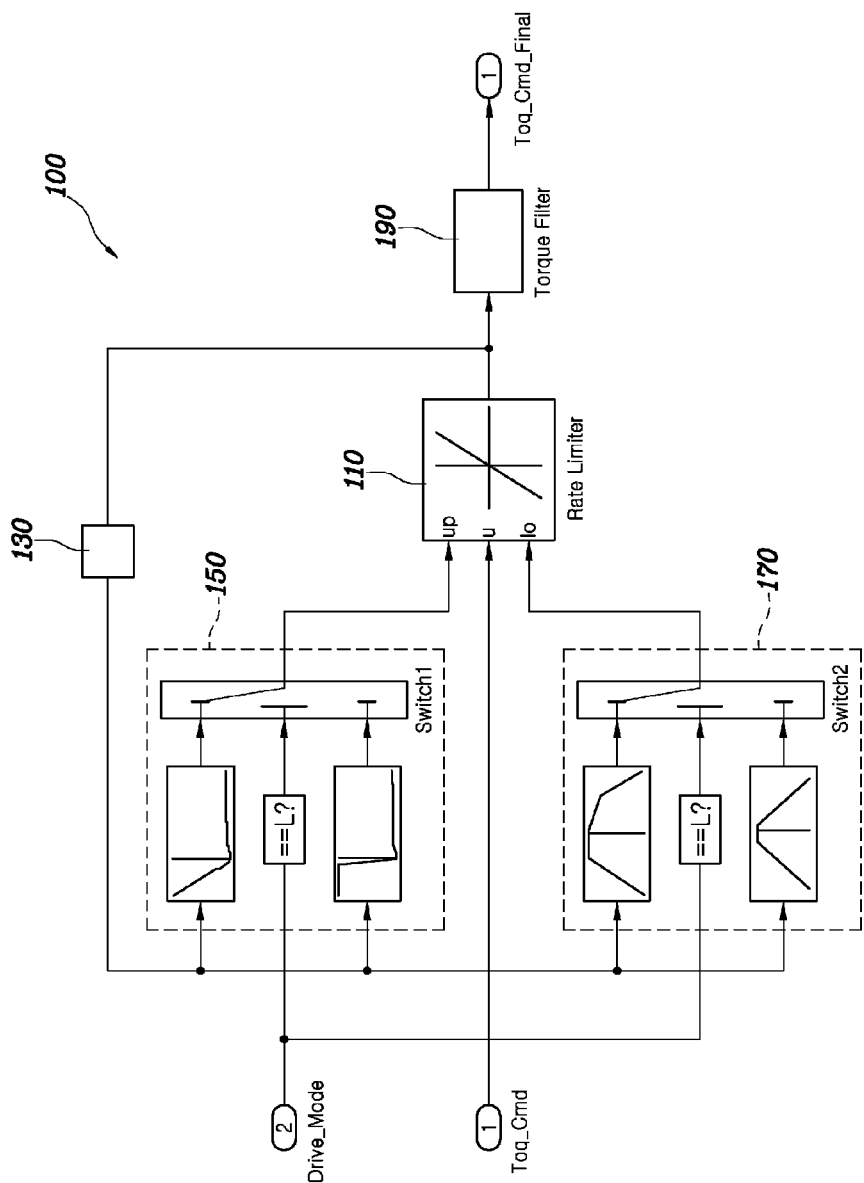
FIG. 1 is an exemplary configuration view that shows a torque control apparatus for a drive motor according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in greater detail to a torque control apparatus and method for a drive motor of the present disclosure, exemplary embodiments of which are illustrated in the accompanying drawings. Wherever possible, the same reference numerals will be used throughout the drawings and the description to refer to the same or like parts.

Figure 2:
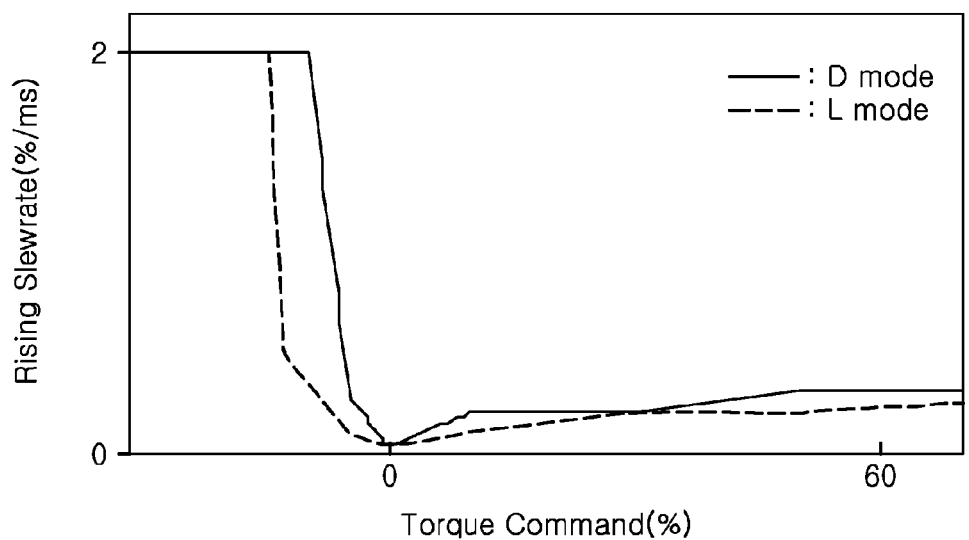
FIG. 2 is an exemplary graph that shows a rising rate map in the torque control apparatus for a drive motor according to an exemplary embodiment of the present disclosure.
Figure 3:
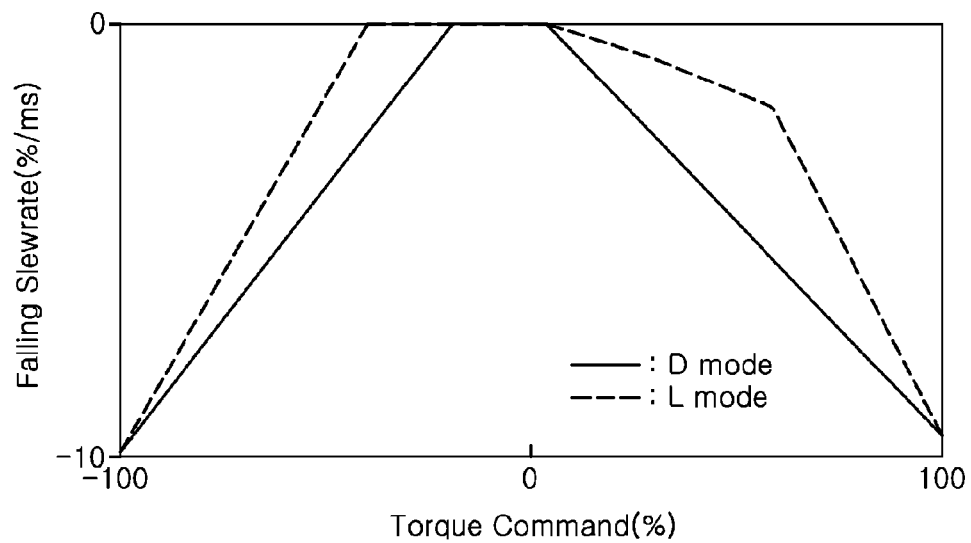
FIG. 3 is an exemplary graph that shows a falling rate map in the torque control apparatus for a drive motor according to an exemplary embodiment of the present disclosure.
Figure 4A:
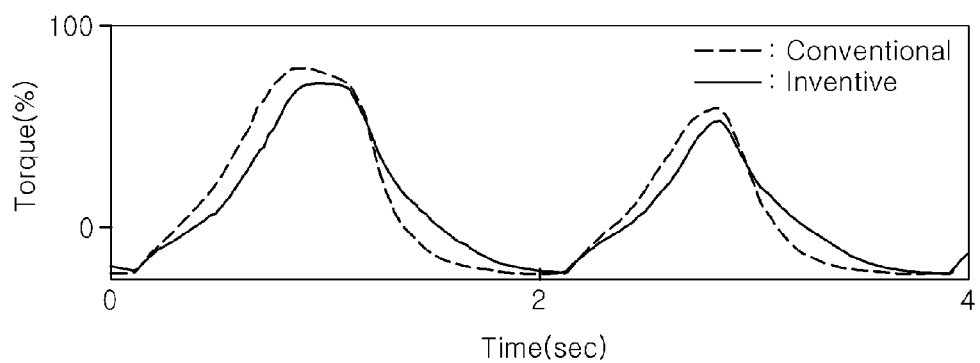
FIG. 4A and FIG. 4B are exemplary graphs that show the effects of the torque control apparatus for a drive motor according to an exemplary embodiment of the present disclosure.
Figure 4B:
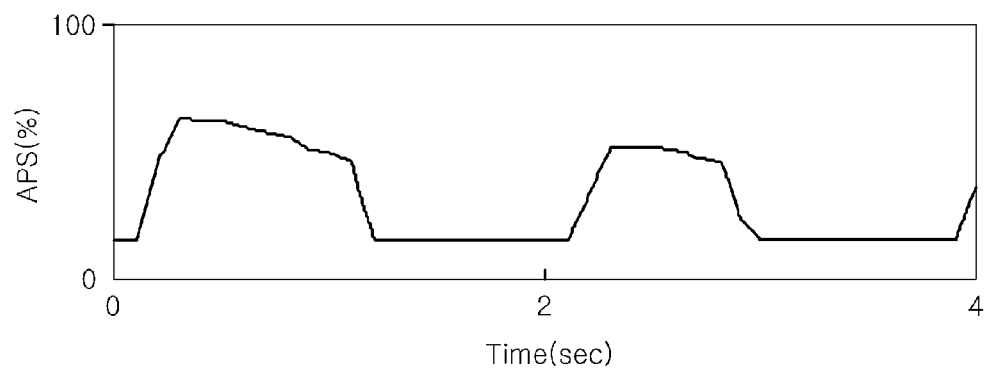
Figure 5:
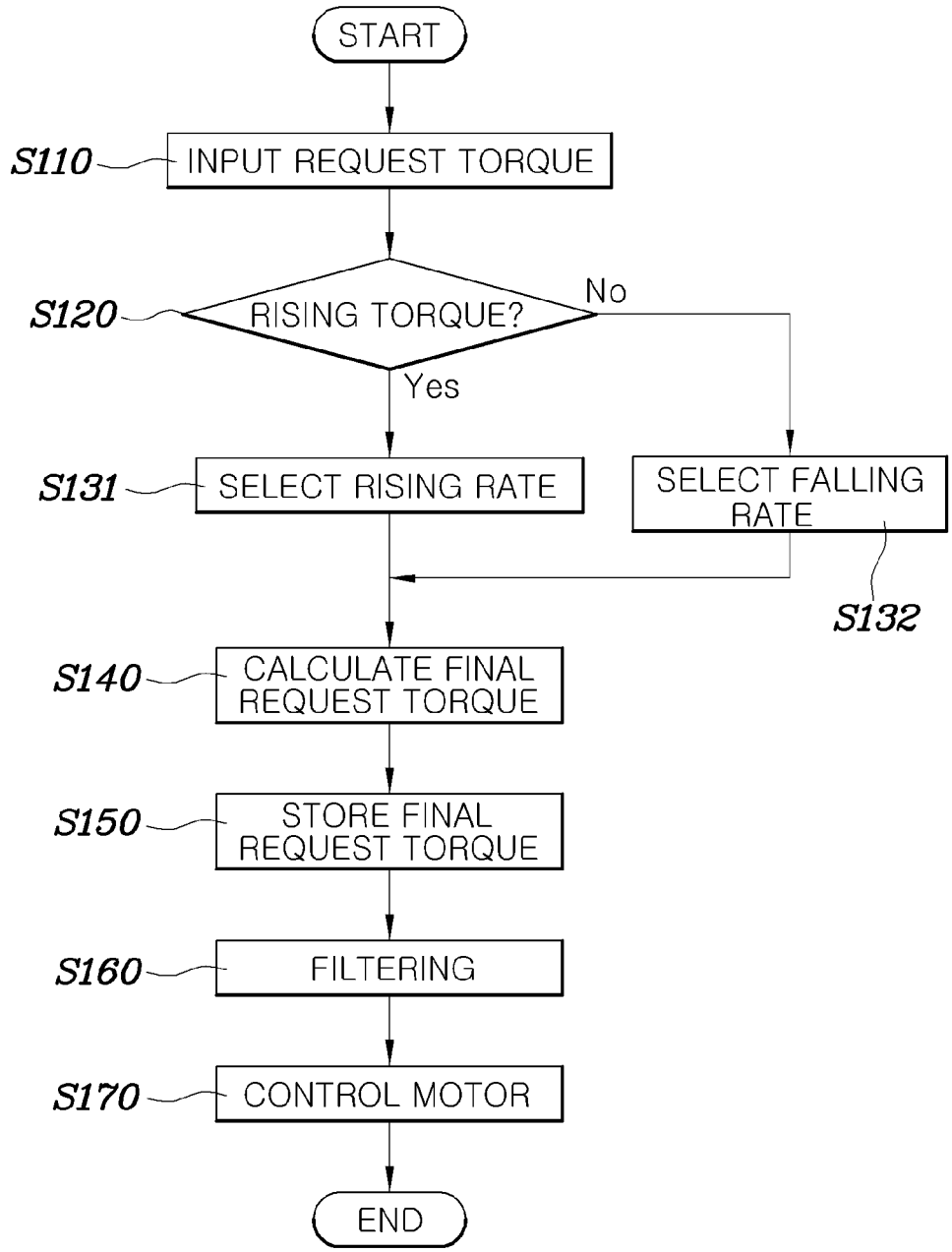
FIG. 5 is an exemplary flowchart that shows a torque control method for a drive motor according to an exemplary embodiment of the present disclosure.

FIG. 1 is an exemplary configuration view that shows a torque control apparatus for a drive motor according to an exemplary embodiment of the present disclosure. FIG. 2 is an exemplary graph that shows a rising rate map in the torque control apparatus for a drive motor according to an exemplary embodiment of the present disclosure. FIG. 3 is an exemplary graph that shows a falling rate map in the torque control apparatus for a drive motor according to an exemplary embodiment of the present disclosure. FIG. 4A and FIG. 4B are exemplary graphs that show the effects of the torque control apparatus for a drive motor according to an exemplary embodiment of the present disclosure. FIG. 5 is an exemplary flowchart that shows a torque control method for a drive motor according to an exemplary embodiment of the present disclosure.

As shown in FIG. 1, the torque control apparatus may include a controller 100 configured to determine whether an input request torque is a rising torque or a falling torque, select a rising rate map and a falling rate map based on the result of the determination of the input request torque; and adjust a rising rate of the rising torque using the rising rate map or a falling rate of the falling torque using the falling rate map.

More particularly, the controller 100 may include a limiter 110 configured to adjust the rising rate or the fall rate of the input request torque; a first supply section 150 configured to store the rising rate map, wherein the first supply section 150 nay be configured to receive a signal of output torque output from the limiter 110 and supply a rising rate corresponding to the output torque to the limiter 110 when the input request torque is determined to be a rising torque; and a second supply section 170 configured to store the falling rate map, wherein the second supply section 170 may be configured to receive the signal of the output torque output from the limiter, and supply a falling rate that corresponds to the output torque to the limiter 110 when the input request torque is determined to be a falling torque.

The limiter 110 may be configured to receive a command of the input request torque. The input request torque command may be input into the controller 100 while an accelerator is manipulated (not shown). Herein, "tip-in" is when pressure is applied to the accelerator pedal (e.g., accelerator is engaged) to accelerate a vehicle, and "tip-out" is when pressure is removed from the accelerator pedal (e.g., accelerator is disengaged). The input request torque may be a torque from a motor to accelerate or decelerate the vehicle. Therefore, the controller 100 may be configured to operate the motor such that the torque of the motor rises or falls based on the request torque.

The controller 100 may be motor control unit (MCU) as is known in the art. A detailed description of inputting the request torque command into the MCU in response to the driver manipulating the accelerator will be omitted since it is known in the art.

The limiter 110 may be configured to adjust a slew rate when the torque of the motor rises or falls so the slope of the rising or falling torque of the motor decreases with time. The slew rate may be a maximum value of the amount of change of an output voltage with respect to time. Further, the limiter 110 may be configured to prevent the torque of the motor from rapidly increasing by adjusting the output voltage that rotates the motor.

A torque filter 190 may be disposed between the limiter 110 and the motor. The torque filter 190 may be configured to detect the output torque from the limiter 110 before the output torque is applied as a drive torque to the motor. The output torque detected by the torque filter 190 may be a request torque signal changed in response to the slew rate (e.g., the rising rate or the falling rate) controlled by the limiter 110. In addition, the torque filter 190 may be configured to remove noise from the signal transferred from the limiter 110 and output the drive torque. Accordingly, the torque of the motor may be controlled by the drive torque output from the torque filter 190.

When the output torque is transferred from the limiter 110 to the torque filter 190, a portion of the output torque signal may be forwarded to the first or second supply section 150 or 170. In addition, a storage section 130, which may be configured to store information regarding the output torque, may be disposed between the first supply section 150 and the second supply section 170. After storing the information on the output torque, the storage section 130 may be configured to transmit the stored information on the output torque to the first or second supply section 150 or 170 so the rising rate or the falling rate input to the limiter 110 may be determined after the request torque. In other words, the information regarding the output torque based on the input torque received may be stored in the storage section 130, and may be used in calculating an output torque of a next input torque.

A rising rate that corresponds to the previous output torque stored in the storage section 130 may be calculated via the first supply section 150. The first supply section 150 may have a plurality of rising rate maps which corresponds to a plurality of shift modes, respectively. One rising rate map may be selected among the plurality of rising rate maps based on information on the present shift mode received by the first supply section 150. The plurality of shift modes may include drive (D) and low (L) shift modes. Subsequently, the plurality of rising rate maps may include a rising rate map of the D shift mode and a rising rate map of the L shift mode. The L shift mode refers to the state in which a vehicle travels at a relatively low speed during regenerative braking, and the D shift mode refers to a typical travel mode of the vehicle that is relatively less influenced by regenerative braking. The basis of judgment on the L and D shift modes may be set by a person skilled in the art.

When the rising rate map is determined, the first supply section 150 may be configured to determine a rising rate value that corresponds to a value of previous output torque supplied from the storage section 130 based on the determined rising rate map, and supply the determined rising rate value to the limiter 110. The limiter 110 may be configured to calculate an output torque value of the present input torque based on the received rising rate value, and transmit the calculated output torque value to the storage section 130 and the torque filter 190.

The falling rate that corresponds to the previous output torque value stored in the storage section 130 may be calculated via the second supply section 170. The falling rate of the request torque may be determined based on the falling rate map stored in the second supply section 170. The second supply section 170 may be configured similar to the first supply section 150. The request torque may be determined by the limiter 110. When the request torque is determined to be a rising torque, the limiter 110 may be configured to determine the output torque value based on the rising rate calculated by the first supply section 150. When the request torque is determined to be a falling torque, the output torque value may be determined based on the falling rate calculated by the second supply section 170.

The limiter 110 may be configured to determine the rising or falling toque by calculating the difference between the request torque and the output torque. The limiter 110 may further be configured calculate the output torque by multiplying the rising or falling rate using a predetermined calculation cycle and subsequently adding the previous output torque to a result value of the multiplication.

For example, when the previous output torque is about 0%, and the present request torque is about 10%, the present state may be a rising state. When a rising rate on the rising rate map corresponding to the request torque is about 0.1%/millisecond (ms), the output torque may be 0%+0.1*T (where T is a calculation cycle). Accordingly, when T is, for example, about 10 ms, the output torque may be 0+0.1*10=1%. At the next calculation cycle, the previous torque may be about 1%. When the request torque is about 20% at the next calculation cycle, the output torque may be calculated to be 1%+(rising rate)*T, limited by a rising rate corresponding to about 1% on the rising rate map.

The limiter 110 may be configured to receive the information regarding the previous output torque provided from the storage section 130 or store such information therein. In addition, the calculation cycle may be a cycle where the request torque is input and the output torque is calculated via an operation within the limiter 110. The calculation cycle may vary as needed by a manufacturer.

FIG. 2 is an exemplary graph that shows a rising rate map from the first supply section 150, and FIG. 3 is an exemplary graph showing a falling rate map from the second supply section 170. As shown in FIG. 2 and FIG. 3, the rising rate map of the D shift mode may differ from the rising rate map of the L shift mode. The rising rate maps of the D and L shift modes may be set by a person skilled in the art.

FIG. 4A and FIG. 4B are exemplary graphs that show the effects of the torque control apparatus for a drive motor according to an exemplary embodiment of the present disclosure, in which FIG. 4A shows exemplary changes in the drive torque with time, and FIG. 4B shows exemplary pressured applied to the accelerator pedal with time. In particular, the request torque may be proportional to the amount the accelerator pedal is pressed.

As shown in FIG. 4A and FIG. 4B, the drive torque may slowly rise when the request torque suddenly rises during session A (e.g., when a tip-in is performed), unlike in the related art. Alternatively, the drive torque may slowly decrease during session B (e.g., when a tip-out is performed).

FIG. 5 is an exemplary flowchart that shows a torque control method for a drive motor according to an exemplary embodiment of the present disclosure. The torque control method may include: determining, by a controller, whether a request torque is a rising torque or a falling torque (S120); selecting, by the controller, a rising rate map (S131) or a falling rate map (S132) based on the determining of the request torque; and adjusting, by the controller, a rising rate of the rising torque using the rising rate map or a falling rate of the falling torque using the falling rate map (S140).

A final value of the request torque, the adjusted rising rate or the adjusted falling rate may be detected once more (S160) and subsequently applied to the motor (S170). The method may also include storing the final value of the request torque, the adjusted rising rate, or the adjusted falling rate (S150) wherein the adjusting of the rising rate or the falling rate may further include adjusting the rising rate or the falling rate of the request torque based on a rising rate or a falling rate that corresponds to a final value of a previous request torque that is previously stored. A rising rate or a falling rate that corresponds to the final value of the request torque stored in the rising rate map or the falling rate map may also be calculated (S140). When a next request torque is input (S110), a final value of request torque may be calculated by applying the calculated rising rate or falling rate to the request torque (S140). Other detailed processes are the same as those generally performed by the controller.

According to the exemplary embodiments of the present disclosure as set forth above, it may be possible to effectively reduce shock and noise caused by a tip-in by controlling the torque of the motor based on the slew rate. Further, it may be possible to improve motor response to acceleration in the tip-in by adjusting the torque of the motor by feeding back the calculated slew rate. Furthermore, ride comfort may also be improved.

Although the exemplary embodiments of the present disclosure have been described for illustrative purposes, those skilled in the art will appreciate that various modifications, additions and substitutions are possible, without departing from the scope and spirit of the present disclosure as disclosed in the accompanying claims.

What is claimed is:

1. A torque control apparatus for a drive motor, comprising:
   a memory configured to store program instructions; and
   a controller configured to execute the program instructions, which when executed cause the controller to:
   determine whether an input request torque is a rising torque or a falling torque;
   select arising rate map or a falling rate map based on a result of the determination of the input request torque;
   adjust a rising rate of the rising torque using the rising rate map or a falling rate of the falling torque using the falling rate map; and
   determine a rising rate or a falling rate of a subsequently-input request torque based on a value of an output torque calculated by the controller,
   wherein the controller includes:
   a first supply section storing the rising rate map and outputting the rising rate corresponding to the value of the output torque from the rising rate map;
   a second supply section storing the falling rate map and outputting the falling rate corresponding to the value of the output torque from the falling rate map; and
   a limiter determining whether the input request torque is the rising torque or the falling torque by comparing the value of the output torque with a value of the input request torque, selecting the rising rate from the first supply section or the falling rate from the second supply section based on a result of the determination of whether the input request torque is the rising torque or the falling torque, and calculating the value of the output torque by applying the selected rising rate or the selected falling rate to the input request torque.

2. The torque control apparatus according to claim 1, wherein the program instructions when executed are further configured to:
   store the value of output torque; and
   determine a rising rate or a falling rate of the subsequently-input request torque based on the stored value of the output torque.

3. The torque control apparatus according to claim 1, wherein the program instructions when executed are further configured to
   store the value of the output torque; and
   determine a rising rate or a falling rate of the subsequently-input request torque based on the stored value of the output torque.

4. The torque control apparatus according to claim 1, wherein the rising rate map is one of a plurality of rising rate maps and the falling rate map is one of a plurality of falling rate maps, and the program instructions when executed are further configured to select one rising rate map or one falling rate map from among the plurality of rising rate maps and the plurality of falling rate maps based on a plurality of shift modes.

5. The torque control apparatus according to claim 4, wherein the plurality of shift modes includes drive (D) shift mode and low (L) shift mode.

6. A torque control method for a drive motor, comprising:
   output, by a controller, a rising rate corresponding to an output torque, which is a target torque for driving the drive motor, from a rising rate map stored in a first supply section of the controller;
   output, by the controller, a falling rate corresponding to the output torque from a falling rate map stored in a second supply section of the controller;
   determining, by a limiter of the controller, whether an input request torque is a rising torque or a falling torque by comparing the input request torque with the output torque;
   selecting, by the limiter, the rising rate from the supply section or the falling rate from the second supply section based on a result of the determination of whether the input request torque is the rising torque or the falling torque;
   calculating, by the limiter, the output torque by applying the selected rising rate or the selected falling rate to the input request torque; and determining, by the controller, a rising rate or a falling rate of a subsequently-input request torque based on a value of the output torque calculated by the controller.

7. The torque control method according to claim 6, further comprising:
storing, by the controller, a final value of the request torque, the controlled rising rate or the controlled falling rate; and
adjusting the rising rate or the falling rate of the request torque based on a rising rate or a falling rate that corresponds to a final value of previous request torque that is previously stored.

8. A non-transitory computer readable medium containing program instructions executed by a controller, the computer readable medium comprising:
program instructions that output a rising rate corresponding to an output torque, which is a target torque for driving the drive motor, from a rising rate map stored in a first supply section of the controller;
program instructions that output a falling rate corresponding to the output torque from a falling rate map stored in a second supply section of the controller;
program instructions that determine whether an input request torque is a rising torque or a falling torque by comparing the input request torque with the output torque;
program instructions that select the rising rate from the first supply section or the falling rate from the second supply section based on a result of the determination of whether the input request torque is the rising torque or the falling torque;
program instructions that calculate the output torque by applying the selected rising rate or the selected falling rate to the input request torque; and
program instructions that determine a rising rate or a falling rate of a subsequently-input request torque based on a value of the calculated output torque.

9. The non-transitory computer readable medium of claim 8, further comprising:
program instructions that store the value of the output torque; and
program instructions that determine a rising rate or a falling rate of the subsequently-input request torque based on the stored value of the output torque.

10. The non-transitory computer readable medium of claim 8, further comprising:
program instructions that store the value of the output torque; and
program instructions that determine a rising rate or a falling rate of the subsequently-input request torque based on the stored value of the output torque.

11. The non-transitory computer readable medium of claim 8, wherein the rising rate map is one of a plurality of rising rate maps and the falling rate map is one of a plurality of falling rate maps, further comprising program instructions that select one map from among the plurality of the rising rate maps and the plurality of the falling rate maps based on a plurality of shift modes.

* * * * *